United States Patent [19]

Smith et al.

[11] 4,178,344

[45] Dec. 11, 1979

[54] METHOD AND APPARATUS FOR REVERSING AND FLATTENING A DRIVER'S RESTRAINT CUSHION

[75] Inventors: Stanley E. Smith, Dayton; Richard W. Lyday, Vandalia; Thomas R. Kushmaul, Springfield, all of Ohio

[73] Assignee: General Motors Corporation, Detroit, Mich.

[21] Appl. No.: 933,711

[22] Filed: Aug. 15, 1978

[51] Int. Cl.$^2$ ............................................. B29C 17/06
[52] U.S. Cl. ......................................... 264/572; 38/2; 38/144; 264/295; 264/314; 425/324.1; 425/387.1; 425/389
[58] Field of Search ................... 425/324.1, 387.1, 389; 264/502, 546, 550, 572, 574, 295, 314, 315; 38/2, 144

[56] References Cited

U.S. PATENT DOCUMENTS

| | | | |
|---|---|---|---|
| 2,878,513 | 3/1959 | Slaughter | 425/324.1 |
| 3,704,189 | 11/1972 | Varga | 264/572 X |
| 3,927,164 | 12/1975 | Shimabukuro | 264/295 X |

*Primary Examiner*—Jan H. Silbaugh
*Attorney, Agent, or Firm*—Edward J. Biskup

[57] ABSTRACT

Method and apparatus for reversing and flattening a driver's restraint cushion composed of a pair of overlapping sheets. The apparatus includes a loading platform having an aperture therein of a size generally corresponding to the size of a circular opening centrally formed in one of the sheets of the restraint cushion. A retainer ring surrounds the aperture and extends into the circular opening of the restraint cushion when the latter is positioned on the loading platform. Subsequently, a vertically movable ram engages and forces the other of the sheets of the restraint cushion through the aperture so as to cause the inside and outside surfaces of the two sheets to reverse after which pressurized air flows through the ram to inflate the cushion and a flat plate presses the inflated cushion into a pancake form.

5 Claims, 11 Drawing Figures

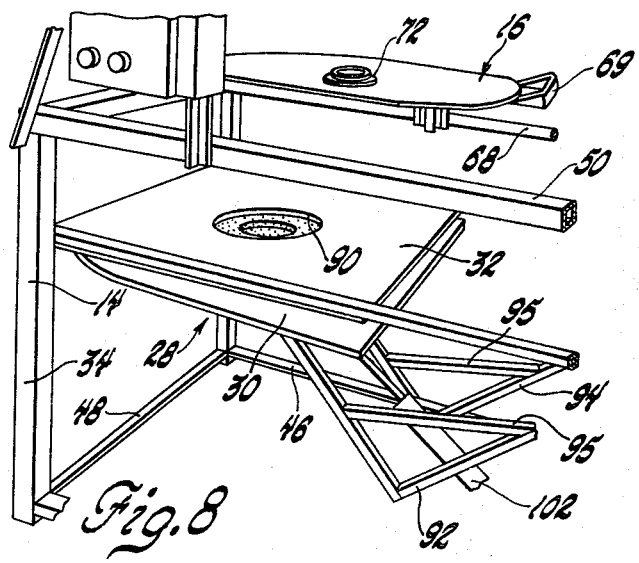
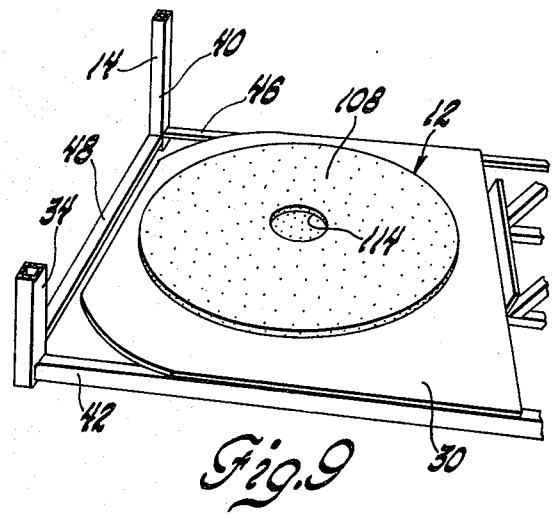
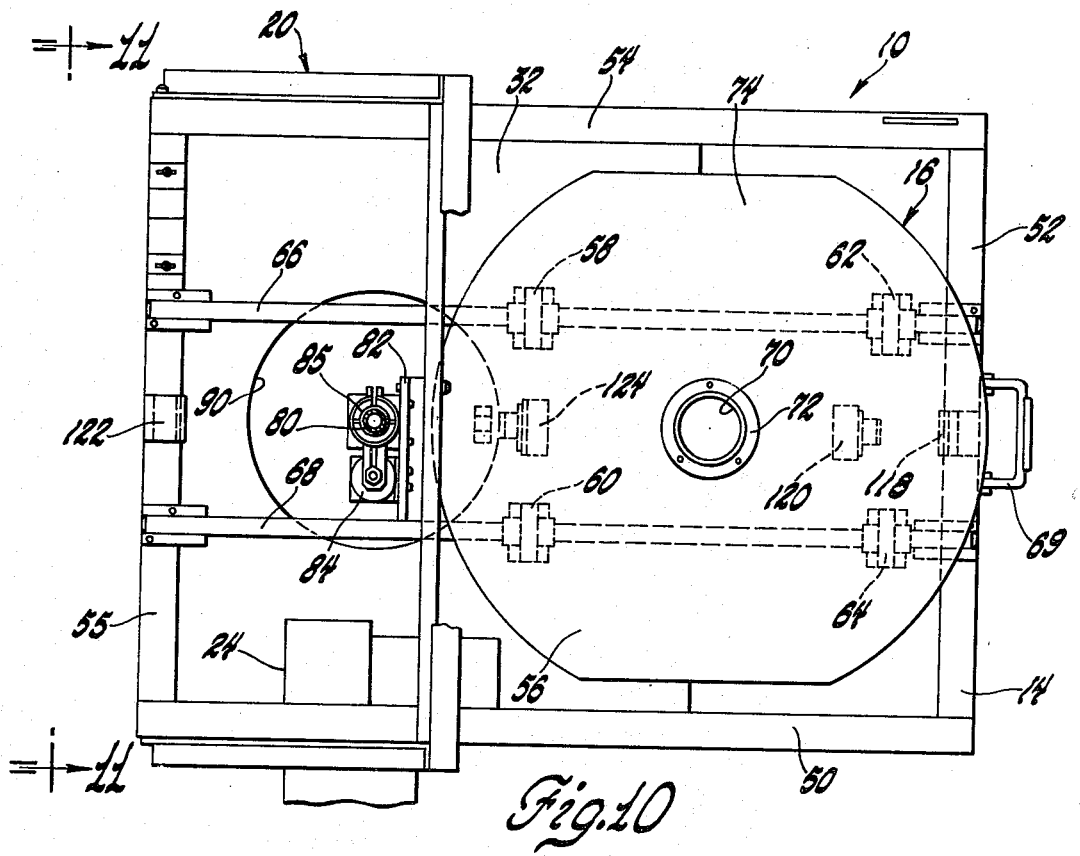
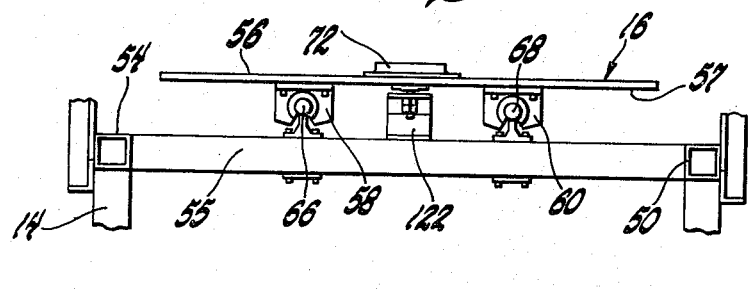

METHOD AND APPARATUS FOR REVERSING AND FLATTENING A DRIVER'S RESTRAINT CUSHION

This invention concerns a method and apparatus for reversing and flattening a driver's restraint cushion and more particularly relates to a method and apparatus that places the sewn outer edges of a restraint cushion inside of the cushion and flattens the seams through a pressing operation while expelling air through an opening in the cushion that normally is connected to a gas generator.

More specifically, this invention contemplates a method and apparatus for reversing and flattening a driver's restraint cushion which is composed of a pair of overlapping circular sheets sewn along the outer peripheral edges thereof. The apparatus includes a base supporting a flat loading platform having an aperture formed therein. The aperture is of a size and configuration that generally corresponds to the size and shape of an opening formed in one of the sheets of the restraint cushion and is surrounded by a retainer ring member which projects upwardly from the platform. The retainer ring member is adapted to extend into a gas generator opening formed in one of the sheets of the restraint cushion when the latter is positioned on the loading platform. A ram is supported for vertical movement on the base and is adapted to engage the other of the sheets of the restraint cushion and force the latter through the opening and through the aperture in the loading platform so as to cause the inside and outside surfaces of the sheets to reverse in position. Afterwards, pressurized air is supplied to the restraint cushion through the ram so that the restraint cushion is inflated. The inflated restraint cushion is then pressed between two flat plates, one of which is rigid with the base and the other of which is pivotally mounted to the base so that the cushion takes the form of a pancake that can be folded and appropriately connected to the gas generator incorporated with a steering wheel assembly.

The objects of the present invention are to provide a new and improved method and apparatus for reversing and flattening a restraint cushion prior to mounting the latter in a steering wheel assembly; to provide a new and improved method and apparatus which allows a sewn driver restraint cushion composed of a pair of overlapping sheets of flexible material to be turned inside out, inflated and then pressed into a pancake form; to provide a new and improved apparatus that flattens the seams of an inverted driver's restraint cushion by pressing the inflated cushion between two plates while simultaneously expelling air from the cushion so as to prevent wrinkles from forming in the cushion material; to provide a new and improved apparatus which serves to reverse two sheets of a driver's air cushion by using a table with a circular aperture surrounded by an upwardly projecting retainer ring and a vertically removable ram that turns the cushion inside out; to provide a new and improved method of reversing a driver's restraint cushion composed of a pair of overlapping sheets so that the inside surfaces of the sheets are on the outside and thereafter pressing the sheets so as to eliminate wrinkles which could hinder the proper folding of the cushion for placement into a steering wheel.

Other objects of the invention will be more apparent from the following detailed description when taken with the drawings in which:

FIG. 8 shows the movable plate member of FIG. 7 in the fully raised position so as to completely flatten the driver's restraint cushion;

FIG. 9 shows the movable plate member in the fully lowered position supporting the flattened driver's restraint cushion;

FIG. 10 is a plan view of the loading platform taken on lines 10—10 of FIG. 1; and FIG. 11 is an end view of the loading platform taken on lines 11—11 of FIG. 10.

Figure 1:
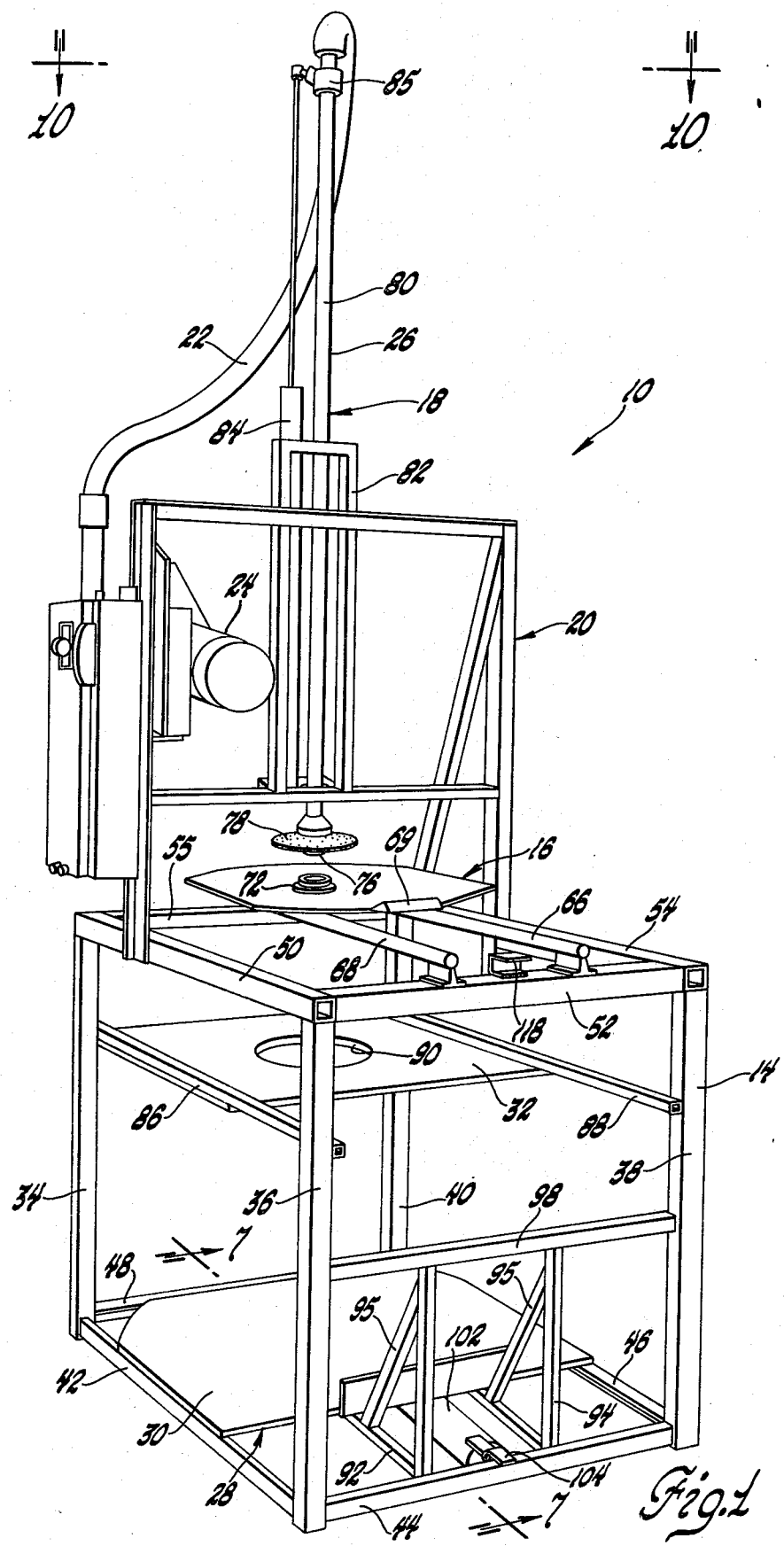
FIG. 1 is a perspective view showing the apparatus according to the invention which serves to reverse, inflate and flatten a driver's restraint cushion.
Figure 2:
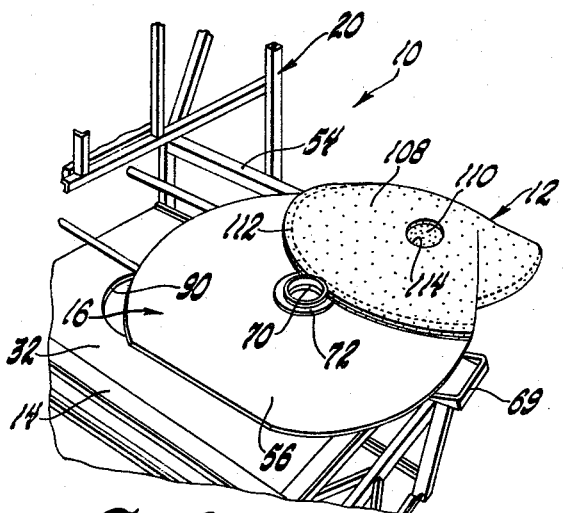
FIG. 2 is a view of the loading platform incorporated with the apparatus of FIG. 1 with a sewn driver's restraint cushion positioned on the platform.

Referring to the drawings and more particularly to FIGS. 1 and 2, an apparatus 10 for reversing, inflating and flattening a driver's restraint cushion 12 in accordance with the invention is disclosed. The apparatus 10 generally consists of a base 14 which supports a loading platform 16 for sliding movement between a load station and a work station. Located above the loading platform 16 and also supported by the base 14 is a ram assembly 18 that is carried by a frame 20 for vertical movement and is connected through a hose 22 to an electric motor driven blower 24 which serves to supply pressurized air to the lower end of a ram 26 as will be explained hereinafter. The base 14 also supports a press assembly 28 which consists of a pair of plate members 30 and 32 for compressing the driver's restraint cushion therebetween after the latter has been inflated.

More specifically, the base 14 consists of four upright posts 34, 36, 38 and 40 which are rigidly interconnected at their lower ends by horizontally extending angle irons 42, 44, 46 and 48. The upper end of the posts 34, 36, 38 and 40 are rigidly interconnected by elongated straight members 50, 52, 54 and 55 which are generally square in cross section and together with the angle irons and posts provide a rigid structure. The upper end of the base 14 supports the loading platform 16 which, as seen in FIGS. 10 and 11, has parallel upper and lower flat surfaces 56 and 57, respectively, and is generally circular in configuration.

The lower surface 57 of the loading platform 14 is fixedly provided with four bearing blocks 58, 60, 62 and 64 which serve to connect the loading platform 16 to a pair of parallel guide rods 66 and 68 fixed between members 52 and 55 so as to allow the loading platform 16 to be shifted through a handle 69 from the load station shown in FIG. 10 to the work station shown in FIG. 1. In addition, the loading platform 16 is centrally formed with a circular aperture 70 that is surrounded by a retainer ring 72 that is secured to the upper surface 56 of the platform and projects upwardly therefrom. When the loading platform 16 is in the work station of FIG. 1, the center of the aperture 70 is vertically aligned with the longitudinal center axis of the ram 26 so that upon downward movement of the latter, the ram 26 extends centrally through the aperture 70.

The ram 26 forms a part of the ram assembly 18 and has a lower end provided with a conically shaped nozzle 76 which is of a diameter less than the diameter of the aperture 70 formed in the loading platform 16. Above the nozzle 76 is a circular diaphragm 78 that is secured to the ram 26 above the nozzle 76. The diaphragm 78 is made of a flexible elastomeric material and is of a diameter greater than the aperture 70 formed in the loading platform 16. The nozzle 76 is connected to the lower end of an elongated pipe section 80 which is supported for vertical movement by a U-shaped guide frame 82. The upper end of pipe section 80 is connected to the hose 22, which in turn, is connected to the source of pressurized air supplied by the blower 24. A double-acting air cylinder 84 has the base end thereof connected to the support frame 20 of the ram assembly 18 while the rod end is connected to the pipe 80 through a coupling member 85. Thus, upon contraction of the air cylinder 84, the ram 26 moves vertically downwardly through the aperture 70 formed in the loading platform 16 when the latter is in the position of FIG. 1. Upon expansion of the air cylinder 84, the ram 26 is raised to the position shown in FIG. 1.

As mentioned hereinbefore, the press assembly 28 consists of a pair of plate members 30 and 32, the latter of which is rigidly connected to a pair of horizontal support members 86 and 88 respectively connected between the posts 34, 36 and 38, 40 of the base 14. The plate member 32 has an enlarged circular opening 90 centrally formed therein the center of which is axially aligned with the longitudinal center axis of the ram 26 so that as the latter moves downwardly, the ram 26 moves through the center of the opening 90. It will be noted that the plate member 32 is located in a plane parallel to the plane of the loading platform 16.

Figure 6:
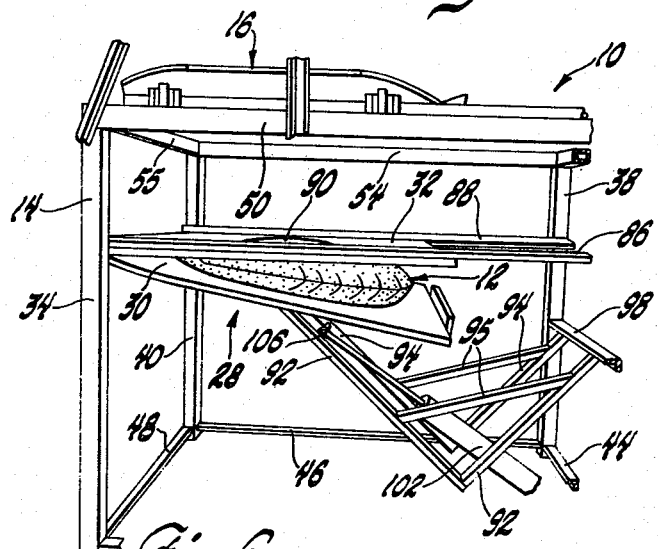
FIG. 6 shows the driver's restraint cushion partially flattened.
Figure 7:
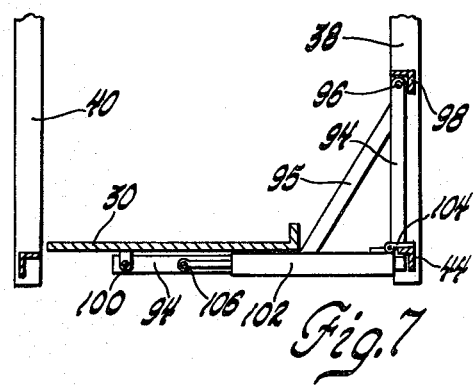
FIG. 7 is a sectional view taken on lines 7—7 of FIG. 1 showing the details of construction of the movable plate member of FIG. 5.

The plate member 30 is located directly beneath the plate member 32 and, as seen in FIG. 7, is supported by a carrier member consisting of a pair of identical L-shaped arms 92 and 94 each of which is provided with a strut member 95. The upper end of each of the arms 92 and 94 is pivotally mounted in a transverse shaft 96 supported by an angle iron 98 that extends between and is rigidly connected to the posts 36 and 38. The plate member 30 has a lower portion thereof pivotally connected to the arms 92 and 94 at a point 100 which allows the plate member 30 to maintain a generally horizontal attitude when in the lower position of FIGS. 1 and 7. A double-acting air cylinder 102 is combined with the arms 92 and 94 and has the base end thereof pivotally connected by a strap 104 to the angle iron 44 midway between the ends thereof. The rod end of the air cylinder 102 is pivotally connected to a cross bar 106 that extends transversely between arms 92 and 94 so that upon expansion of the air cylinder 102, the arms 92 and 94 are pivoted about the support shaft 96 in a clockwise direction to the positions seen in FIGS. 5, 6 and 8, and cooperates with the plate member 32 for compressing the restraint cushion 12 in a manner to be explained hereinafter.

As seen in FIG. 2, the driver's restraint cushion 12 is of the type that can be incorporated with the steering wheel of a motor vehicle and is shown draped over one side of the loading platform 16. The restraint cushion 12 consists of a pair of overlapping circular sheets 108 and 110 of porous material such as nylon or dacron which are sewn together by stitches along a circular line 112 located adjacent the outer edge thereof. A circular opening 114 is provided in the center of the sheet 108 and is adapted to be sealingly connected to a gas generator normally carried by the steering wheel assembly so when the gas generator is activated, the restraint cushion 12 is inflated.

Figure 3:
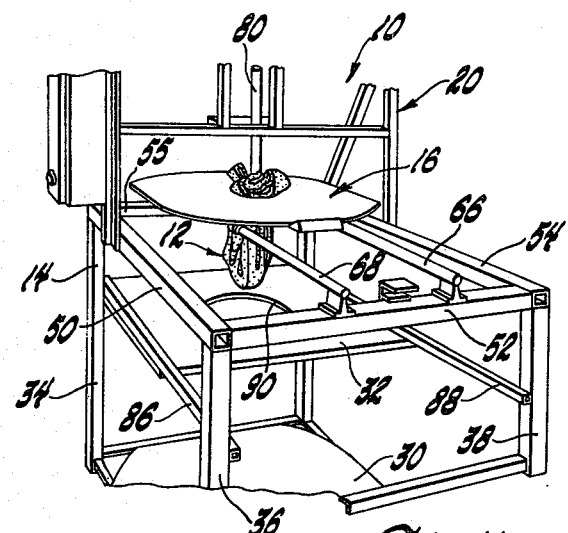
FIG. 3 shows the ram which forms a part of the apparatus of FIG. 1 moving through an aperture formed in the loading platform so as to reverse the positions of the two sheets which comprise the driver's restraint cushion.
Figure 4:
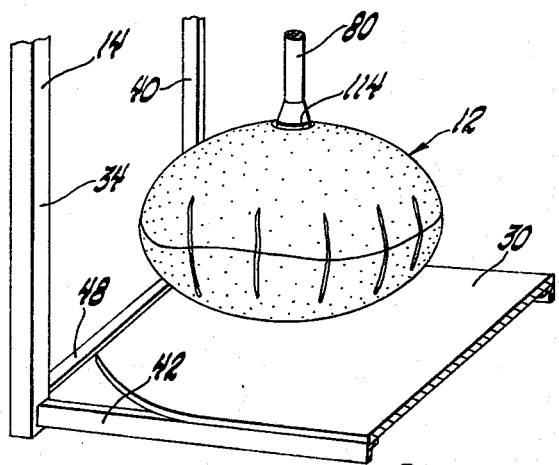
FIG. 4 shows the driver's restraint cushion supported by the ram in an inflated condition; 3
Figure 5:
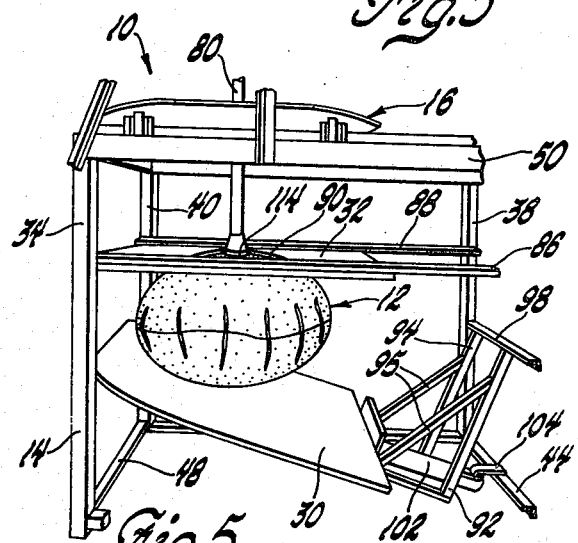
FIG. 5 shows the inflated driver's restraint cushion of FIG. 4 prior to being flattened by a movable plate member which forms a part of the apparatus of FIG. 1.

It is important to have the restraint cushion 12 provided with a continuous smooth outer surface and, therefore, the restraint cushion 12 as seen in FIG. 2 must have the outside surfaces of the sheets 108 and 110 reversed in position so that the sewn outer edges of the sheets are located on the inside of the cushion. The apparatus 10 described above accomplishes this function in a manner which will now be explained. With the ram 26 positioned as shown in FIG. 1, the loading platform 16 is first moved to the load station shown in FIG. 10. Stop members 118 and 120, respectively mounted on the member 52 and the lower surface 57 of the loading platform cooperate to provide the load station position for the loading platform 16. The sewn restraint cushion 12 shown in FIG. 2 is then positioned on the loading platform 16 with the gas generator opening 114 placed over the retainer member 72. The loading platform 16 is then returned to the work station shown in FIG. 1 as determined by the stop members 122 and 124 respectively mounted on the member 55 and the lower surface 57 of the loading platform 16. Afterwards, the air cylinder 84 is contracted so as to cause the nozzle 76 to contact the outer surface of the sheet 110 and cause the latter to be moved through the aperture 70 so as to cause reversal of the positions of the sheets 108 and 110. This occurs because the opening 114 in sheet 108 is generally of the same diameter as the diameter of the retainer ring 72 so that the latter holds the circular edge of the restraint cushion material surrounding the retainer ring 72 as the ram 26 moves through the aperture 70. This movement of the nozzle 76 through the aperture 70 is shown in FIG. 3. It will be noted that as the nozzle 76 moves through the aperture 70, the diaphragm 78 similarly moves through the aperture 70 so that, upon a complete reversal of the sheets 108 and 110, the diaphragm 78 is located on the inside of the restraint cushion 12. As the ram 26 continues to move downwardly, it strips the restraint cushion 12 from the retainer ring 72 and then moves through the enlarged opening 90 formed in the plate member 32. The opening 90 is of a size which allows the inverted restraint cushion 12 to move therethrough without any interference. When the nozzle 76 is below the opening 90, the electric motor of the blower 24 is energized causing compressed air to flow through the hose 22 and the pipe 80 into the interior of the restraint cushion 12 and cause the latter to inflate as seen in FIG. 4. The air pressure within the cushion is sufficient to cause the diaphragm 78 to provide a seal along the circular edge of the opening 114 in the restraint cushion 12 so as to maintain inflation of the restraint cushion. In this regard it will be noted that the diameter of the diaphragm is greater than the diameter of the opening 114 in the restraint cushion 12, and should be of a size sufficient to provide a good seal when the cushion is inflated. Afterwards, the air cylinder 102 of the press assembly 28 is expanded causing the plate member 30 to pivot upwardly about the support shaft 96 as seen in FIG. 5. As the plate member 30 continues to move upwardly, it contacts the lower end of the inflated restraint cushion 12 and continues to move in an upwardly direction as seen in FIG. 6 until the cushion 12 is completely flattened as seen in FIG. 8. It will be noted that at the same time that the plate member 30 is powered upwardly relative to the plate member 32, the nozzle 76 of the ram 26 is moved upwardly by expanding the air cylinder 84 thereby causing the diaphragm 78 to be stripped from the opening 114 in the restraint cushion 12 by the opening 90. In this manner, the pressing operation occurs while the restraint cushion 12 is still inflated with the upward moving plate member causing the air within the cushion to be expelled via the opening 114 therein. After the restraint cushion 12 is fully flattened, the air cylinder 102 of the press assembly 28 is then contracted so as to cause the plate member 30 to return to its lowered position of FIGS. 1 and 9 together with the flattened restraint cushion 12 so that subsequently the restraint cushion 12 can be removed from the plate member 30.

As mentioned above, the flattening of the restraint cushion 12 occurs while the latter is inflated so that in effect, the air pressure within the inflated cushion is used to remove any wrinkles in the cushion material while the latter is being pressed flat by the plate members 30 and 32. It will also be noted that when the restraint cushion 12 is inflated, both static and dynamic pressures can be measured to evaluate the leak rate of the cushion. Thus, the flattening operation, as described above, eliminates wrinkles in the restraint cushion 12 and thereby allows consistent folding of the cushion into a small bundle for placement into the steering wheel assembly.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. Apparatus for reversing and flattening an occupant restraint cushion composed of a pair of overlapping sheets of flexible material secured along the outer edges thereof with one of said sheets having an opening located therein, said apparatus comprising a base supporting a loading platform having an aperture formed therein of a size generally corresponding to the size of said opening in said one of said sheets, a retaining member secured to said platform adjacent said aperture, said retaining member adapted to extend into said opening in said one of said sheets when the restraint cushion is positioned onto said loading platform and temporarily hold the latter mentioned sheet thereto, a ram supported by said base and adapted to engage the other of said sheets and force the latter through the opening in said one of said sheets and through the aperture in the loading platform and afterwards strip said one of said sheets from said retaining member so as to cause the inside and outside surfaces of said sheets to reverse, a source of pressurized air connected to said ram for supplying pressurized air to said restraint cushion so as to inflate the latter after said pair of sheets pass through said aperture, and means for compressing the inflated cushion into a pancake form.

2. Apparatus for reversing and flattening an occupant restraint cushion composed of a pair of overlapping sheets of flexible material secured along the outer edges thereof with one of said sheets having an opening located therein, said apparatus comprising a base supporting a loading platform having an aperture formed therein of a size generally corresponding to the size of said opening in said one of said sheets, a retaining ring projecting from one side of said platform and surrounding said aperture, said retaining ring adapted to extend into said opening in said one of said sheets when the restraint cushion is positioned onto said loading platform and temporarily hold the latter mentioned sheet thereto, a ram having one end thereof provided with a nozzle and being normally supported by said base for vertical movement relative to the loading platform, said ram adapted to engage the other of said sheets when moved in a downward direction and force the latter mentioned sheet through the opening in said one of said sheets and through the aperture in the loading platform and afterwards strip said one of said sheets from the retaining ring so as to cause the inside and outside surfaces of said sheets to reverse, a source of pressurized air connected to said nozzle for supplying pressurized air to said restraint cushion so as to inflate the latter after said pair of sheets pass through said aperture, and means operatively associated with said base for compressing the inflated cushion into a pancake form.

3. Apparatus for reversing and flattening an occupant restraint cushion composed of a pair of overlapping sheets of flexible material secured along the outer edges thereof with one of said sheets having an opening located therein, said apparatus comprising a base supporting a loading platform for sliding movement between a load station and a work station, said loading platform having an aperture formed therein of a size generally corresponding to the size of said opening in said one of said sheets, a retaining ring projecting from one side of said platform and surrounding said aperture, said retaining ring adapted to extend into said opening in said one of said sheets when the restraint cushion is positioned onto said loading platform, a ram having one end thereof formed with a flexible diaphragm and being supported by said base for vertical movement, said one end of said ram adapted to engage the other of said sheets when the loading platform is in the work position and force said other of said sheets through the opening in said one of said sheets and through the aperture in the loading platform so as to cause the inside and outside surfaces of said sheets to reverse with the diaphragm positioned within the restraint cushion, a source of pressurized air connected to said ram for supplying pressurized air to said restraint cushion so as to inflate the latter after said pair of sheets pass through said aperture, and a pair of plate members, one of said plate members being rigidly secured to said base and the other plate member being pivotally connected to said base so that upon pivotal movement of said other plate member towards said one of said plate members the inflated cushion is compressed into a pancake form.

4. A method for reversing an occupant restraint cushion and removing wrinkles therefrom wherein said restraint cushion is composed of a pair of overlapping sheets of flexible material sewn together along the outer edges thereof with one of the sheets having an opening located therein, said method comprising the steps of positioning the restraint cushion on a flat platform with said one of said sheets contacting one side of said platform and with said opening registering with an aperture formed in said platform that is of a size corresponding to the size of said opening, forcing the other of said sheets through said aperture in the platform and through said opening so as to cause the inside and outside surfaces of said sheets to reverse in position and have the restraint cushion located adjacent the other side of the platform, supplying pressurized air to said restraint cushion through said opening so as to inflate the latter, and pressing the inflated restraint cushion between a pair of flat plate members so as to expel the air through said opening and thereby flatten the restraint cushion.

5. A method for reversing an occupant restraint cushion and removing wrinkles therefrom wherein said restraint cushion is composed of a pair of overlapping sheets of flexible material sewn together along the outer edges thereof with one of the sheets having an opening located therein, said method comprising the steps of positioning the restraint cushion on a flat platform with said one of said sheets contacting one side of said platform and with said opening registering with an aperture formed in said platform that is of a size and shape corresponding to the size and shape of said opening, forcing the other of said sheets through said aperture in the platform through said opening while temporarily holding the material surrounding said opening so as to cause the inside and outside surfaces of said sheets to reverse in position and have the entire restraint cushion located adjacent the other side of the platform, closing said opening and simultaneously supplying pressurized air to said restraint cushion so as to inflate the latter, uncovering the opening in said restraint cushion, and pressing the inflated restraint cushion between a pair of flat plate members so as to expel the air through said opening and thereby flatten the restraint cushion along the sewn outer edges thereof.

* * * * *